March 8, 1966   F. A. PELLICCIOTTI   3,238,786
WHEEL UNBALANCE MEASURING
Filed Jan. 14, 1963
FIG. 2
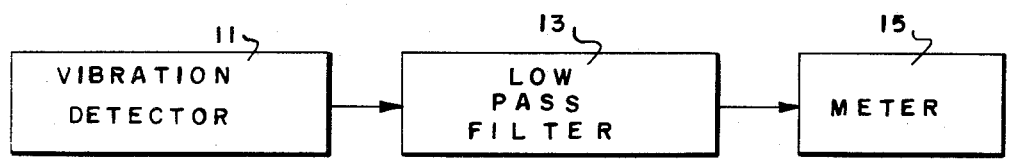
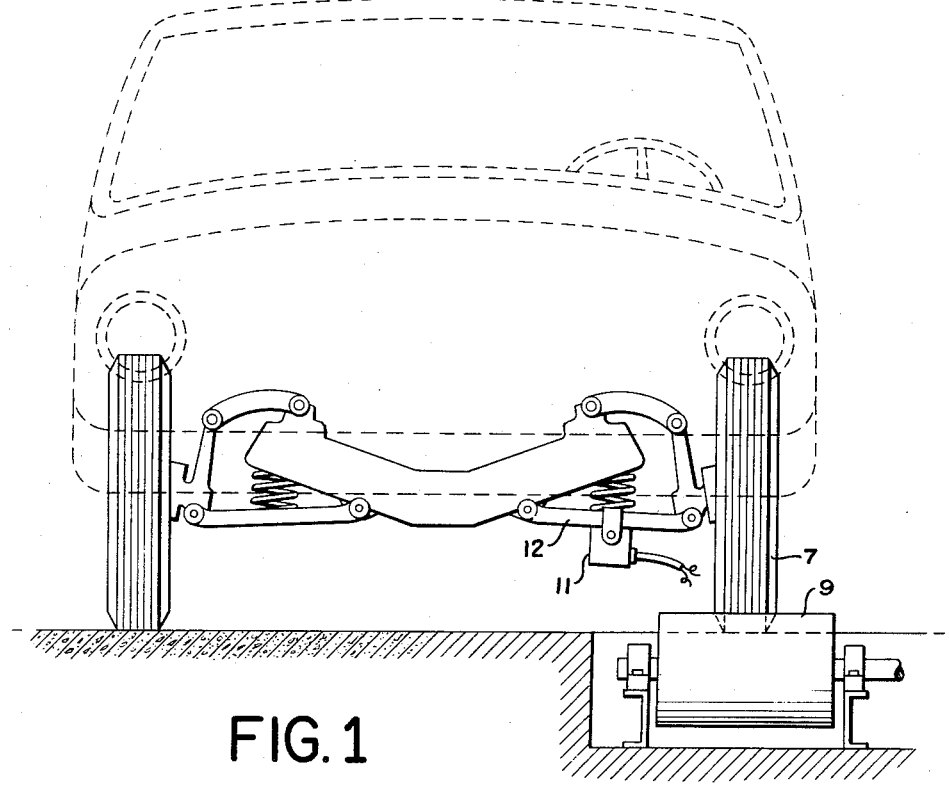
FIG. 1

United States Patent Office 3,238,786
Patented Mar. 8, 1966

3,238,786
WHEEL UNBALANCE MEASURING
Fernando Albert Pellicciotti, 1501 N. Labrea Ave.,
Inglewood, Calif.
Filed Jan. 14, 1963, Ser. No. 251,177
2 Claims. (Cl. 73—457)

This invention relates to wheel unbalance measuring, and more particularly to a wheel unbalance measuring system which can be quickly used to take wheel unbalance measurements.

The wheel unbalance measuring system of the present invention is designed to be used as part of a system for thoroughly testing and checking motor vehicles for any defects, malfunctionings and other conditions which may require correction. This system is fully disclosed in the copending application entitled "Vehicle Diagnostic System," invented by George B. Myrtetus and Charles H. Pancoast, Serial Number 241,214, filed November 30, 1962. The copending application Serial Number 241,214 has been abandoned in favor of a continuation-in-part application Serial Number 276,702 of George B. Myrtetus and Charles H. Pancoast, filed April 30, 1963, entitled Diagnostic Line Method for Large Numbers of Automotive Road Vehicles. The continuation-in-part application Serial Number 276,702 contains substantially all of the disclosure of application Serial Number 241,214. As pointed out in this copending application, the diagnostic system disclosed therein depends for its economic practicality on the entire diagnostic process being carried out in just a few minutes with a minimum of personnel. Thus time is of the essence, and any feature which will save even a few seconds in the diagnostic process is important to the system, as it is only by these time-saving features that the diagnostic system becomes economically practical. The wheel unbalance measuring system of the present invention reduces the time required to take wheel unbalance measurements and thus saves valuable time in the diagnostic process disclosed in the above-mentioned copending application. Thus the wheel unbalance measuring system of the present invention contributes substantially to the making of this diagnostic system economically practical.

The wheel unbalance measuring system of the present invention comprises a vibration detector which is connected to the wheel suspension assembly of the vehicle wheel, the unbalance of which is being measured. The output from the vibration detector is fed to a low pass filter which removes all components in the output signal of the vibration detector above a predetermined frequency. The remaining components below this predetermined frequency comprising the output signal of the low pass filter are fed to a meter which measures the amplitude of the applied signal. To take the wheel unbalance measurement, the wheel of the vehicle is positioned on a pair of rollers and the rollers are then operated to drive the wheel of the vehicle at a predetermined speed. The number of cycles per second in the cutoff frequency of the low pass filter is selected to be above the number of revolutions per second that the wheel is driven by the rollers. With this arrangement, the amplitude of the output signal of the low pass filter will be proportional to the wheel unbalance and the meter will provide an indication of the wheel unbalance. Because the wheel unbalance measurement using this system can be taken in a shorter period of time than the systems of the prior art, the wheel unbalance measuring system of the present invention saves valuable time in the diagnostic process disclosed in the above-mentioned copending application and contributes substantially to the making of this diagnostic process economically practical.

Accordingly, a principal object of the present invention is to provide an improved wheel unbalance measuring system.

Another object of the present invention is to reduce the time to take wheel unbalance measurements.

A further object of this invention is to provide a wheel unbalance measuring system which can be used to take wheel unbalance measurements in a short period of time.

Further objects and advantages of the present invention will become readily apparent as the following detailed description of the invention unfolds and when taken in conjunction with the drawings, wherein FIGURE 1 illustrates a vehicle having the balance of one of its wheels tested in accordance with the present invention; and FIGURE 2 is a block diagram illustrating the system of the present invention.

In accordance with the present invention, the unbalance of a vehicle wheel is measured by a vibration detector adapted to be fastened to the wheel suspension assembly of an automotive vehicle. As shown in FIGURE 2, the vehicle wheel which is designated by the reference number 7, is positioned on a pair of rollers 9 without removing the wheel from the vehicle. The vibration detector which is designated by the reference number 11, is then fastened to the suspension assembly of the vehicle wheel and preferably to the lower control arm 12 thereof. As shown in FIGURE 2, the output from the vibration detector 11 is fed to a low pass filter 13, which removes all the components in the output signal of the vibration detector above its cutoff frequency. The remaining components in the output signal of the low pass filter are fed to a meter 15, which measures the amplitude of the output signal of the low pass filter 13. The vehicle wheel is then driven by the rollers at a predetermined speed. The number of cycles per second in the cutoff frequency in the low pass filter is selected to be above the number of revolutions per second that the vehicle wheel is driven. When the vehicle wheel is rotated in this manner, the vibration detector 11 attached to the wheel suspension assembly will generate a signal proportion to the amount of unbalance of the vehicle wheel at a frequency having a number of cycles per second equal to the number of revolutions per second that the wheel is rotating. The low pass filter 13 serves to remove noise and other extraneous signals not caused by wheel unbalance from the output signal of the vibration detector 11. There will be substantially no extraneous signals or noise at frequencies below the number of revolutions per second that the wheel is rotating. As a result, the output signal from the low pass filter 13 will have an amplitude proportional to the wheel unbalance of the vehicle wheel, and the meter 15, which measures and indicates the amplitude of the output signal of the low pass filter, will indicate the amount of wheel unbalance. In this manner the low pass filter 13 and the meter 15 detect the component of the output signal of the vibration detector at the frequency equal in cycles per second to the speed of the vehicle wheel in revolutions per second, or in other words detects the component caused by wheel unbalance.

Many modifications may be made to the above-described specific embodiment of the invention without departing from the spirit and scope of the invention, which is defined in the appended claims.

What is claimed is:
1. A method of measuring wheel unbalance of a wheel of an automotive vehicle comprising the steps of attaching a vibration detector to the wheel suspension assembly for said vehicle wheel, rotating said vehicle wheel at a predetermined speed while said wheel is mounted on said wheel suspension assembly and is loaded by its normal share of the weight of said vehicle, and detecting the amplitude of the component in the output signal of said vibration detector at the frequency having a number of cycles per second equal to the number of revolutions per second that said wheel is rotated at said predetermined speed.

2. A method of measuring wheel unbalance of a wheel of an automotive vehicle comprising the steps of attaching a vibration detector to the wheel suspension assembly for the vehicle wheel, rotating said vehicle wheel at a predetermined speed while said wheel is mounted on said wheel suspension assembly and is loaded by its normal share of the weight of said vehicle, filtering out all components in the output signal of said vibration detector above a predetermined frequency the number of cycles per second of which is greater than the number of revolution per second of said predetermined speed.

References Cited by the Examiner

UNITED STATES PATENTS

| | | | |
|---|---|---|---|
| 1,548,193 | 8/1925 | Fennell | 73—117 |
| 2,067,803 | 1/1937 | Thearle | 73—117 |
| 2,130,900 | 9/1938 | Presbrey | 73—117 |
| 2,243,457 | 5/1941 | Esval | 73—462 |
| 2,920,481 | 1/1960 | Hulswit | 73—146 |
| 3,078,720 | 2/1963 | Hofmann | 73—457 |

FOREIGN PATENTS 1,115,054  10/1961  Germany.

RICHARD C. QUEISSER, *Primary Examiner.*

JAMES GILL, *Examiner.*